US012749464B2

(12) United States Patent
Yang et al.

(10) Patent No.: US 12,749,464 B2
(45) Date of Patent: Sep. 29, 2026

(54) SCREEN CONTROL METHOD AND SCREEN CONTROL APPARATUS

(71) Applicant: ASUSTEK COMPUTER INC., Taipei (TW)

(72) Inventors: Li-Chi Yang, Taipei (TW); Chih-Hsien Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 19/233,083

(22) Filed: Jun. 10, 2025

(65) Prior Publication Data

US 2026/0212839 A1 Jul. 23, 2026

(30) Foreign Application Priority Data

Jan. 20, 2025 (TW) ................................ 114102328

(51) Int. Cl.
*G09G 5/10* (2006.01)
*G06F 3/0354* (2013.01)
*G06F 3/041* (2006.01)

(52) U.S. Cl.
CPC ........... *G09G 5/10* (2013.01); *G06F 3/03543* (2013.01); *G06F 3/03547* (2013.01); *G06F 3/0412* (2013.01); *G09G 2320/0626* (2013.01); *G09G 2360/144* (2013.01)

(58) Field of Classification Search
CPC ............. G09G 5/10; G09G 2320/0626; G09G 2360/144; G06F 3/03547; G06F 3/0412
See application file for complete search history.

(56) References Cited

U.S. PATENT DOCUMENTS 9,311,526 B2 * 4/2016 Kuo ..................... G06V 40/172
2002/0180812 A1 * 12/2002 Kim ......................... G09G 5/14
715/856

(Continued)

FOREIGN PATENT DOCUMENTS

CN 102073401 A 5/2011
CN 110556080 A 12/2019

(Continued)

*Primary Examiner* — Ariel A Balaoing
(74) *Attorney, Agent, or Firm* — MUNCY, GEISSLER, OLDS & LOWE, P.C.

(57) ABSTRACT

A screen control method is provided, applicable to an electronic apparatus. The electronic apparatus includes a screen and an ambient light detector. The screen is configured to display an original picture. The ambient light detector is configured to detect ambient brightness to generate ambient brightness data. The electronic apparatus is also coupled to a pointer device to present a pointer on the original picture accordingly. The screen control method includes the following steps: obtaining lighting setting data; obtaining position data of the pointer, and generating lighting area data according to the position data; converting, according to the lighting setting data, the ambient brightness data, and the lighting area data, the original picture to generate a lighting adjustment picture, where the lighting adjustment picture includes a lighting area corresponding to the pointer; and presenting the lighting adjustment picture on the screen. A screen control apparatus is also provided.

12 Claims, 6 Drawing Sheets

(56) References Cited

U.S. PATENT DOCUMENTS

| | | | | |
|---|---|---|---|---|
| 2007/0040774 | A1* | 2/2007 | Lee | G09G 3/3233 345/77 |
| 2009/0202170 | A1* | 8/2009 | Weiss | H04N 1/4097 382/275 |
| 2010/0207886 | A1 | 8/2010 | Ryu | |
| 2011/0273466 | A1* | 11/2011 | Imai | G09G 3/20 345/589 |
| 2014/0043262 | A1* | 2/2014 | Pi | G06F 3/0488 345/694 |
| 2015/0287389 | A1* | 10/2015 | Mese | G09G 5/10 345/207 |
| 2016/0269677 | A1* | 9/2016 | Lee | H04N 21/4728 |
| 2017/0047019 | A1* | 2/2017 | Li | G09G 3/2092 |
| 2021/0335320 | A1* | 10/2021 | Tokuchi | G09G 5/10 |
| 2025/0245797 | A1* | 7/2025 | De Vries | G06V 20/44 |

FOREIGN PATENT DOCUMENTS

| | | | |
|---|---|---|---|
| CN | 114980450 | A | 8/2022 |
| CN | 218525293 | U | 2/2023 |
| CN | 117971092 | A | 5/2024 |
| TW | 200733025 | A | 9/2007 |
| TW | I862069 | B | 11/2024 |

* cited by examiner

SCREEN CONTROL METHOD AND SCREEN CONTROL APPARATUS

CROSS-REFERENCE TO RELATED APPLICATION

This application claims the priority benefit of Taiwan Application Serial No. 114102328, filed on Jan. 20, 2025. The entirety of the above-mentioned patent application is hereby incorporated by reference herein and made a part of specification.

BACKGROUND OF THE INVENTION

Field of the Invention

The disclosure relates to a screen control method and a screen control apparatus, and in particular, to a screen control method and a screen control apparatus for adjusting local brightness of a screen.

Description of the Related Art

When a user browses or reads file data on a screen of a notebook computer in a dark environment (in an embodiment, on a plane, on a bus, or in a coffee shop), the user usually needs to increase screen brightness to clearly see screen content. However, increasing the screen brightness easily affects other people in the same environment. In addition, when the user is in a public place, sensitive information is easily peeped at by people around, leading to a risk of data leakage.

BRIEF SUMMARY OF THE INVENTION

The disclosure provides a screen control method, applicable to an electronic apparatus. The electronic apparatus includes a screen and an ambient light detector. The screen is configured to display an original picture. The ambient light detector is configured to detect ambient brightness to generate ambient brightness data. The electronic apparatus is also coupled to a pointer device to present a pointer on the original picture accordingly. The screen control method includes the following steps: obtaining lighting setting data; obtaining position data of the pointer, and generating lighting area data according to the position data; converting, according to the lighting setting data, the ambient brightness data, and the lighting area data, the original picture to generate a lighting adjustment picture, where the lighting adjustment picture includes a lighting area corresponding to the pointer; and presenting the lighting adjustment picture on the screen.

The disclosure also provides a screen control apparatus, applicable to an electronic apparatus. The electronic apparatus includes a screen and an ambient light detector. The screen is configured to display an original picture. The ambient light detector is configured to detect ambient brightness to generate ambient brightness data. The electronic apparatus is also coupled to a pointer device to present a pointer on the original picture accordingly. The screen control apparatus includes a lighting setting unit, a lighting position obtaining unit, and a picture adjustment unit. The lighting setting unit is configured to set lighting setting data corresponding to the pointer. The lighting position obtaining unit is configured to obtain position data of the pointer, and generate lighting area data according to the position data. The picture adjustment unit is configured to convert, according to the lighting setting data, the ambient brightness data, and the lighting area data, the original picture to generate a lighting adjustment picture, and present the lighting adjustment picture on the screen, where the lighting adjustment picture includes a lighting area corresponding to the pointer.

In conclusion, according to the screen control apparatus in the disclosure, an original picture presented on a screen is converted to a lighting adjustment picture by using ambient brightness data obtained by an ambient light detector and lighting area data obtained by tracking a position of a pointer device. This is beneficial to a user to browse or read content on a picture on the screen in a dark environment, without entirely increasing screen brightness. In this way, eye discomfort is reduced, and people around is also not affected. In addition, locally increasing picture brightness also effectively prevents sensitive information on the screen from being peeped at by people around, thereby improving privacy protection of data.

DETAILED DESCRIPTION OF THE EMBODIMENTS

More detailed descriptions of specific embodiments of the disclosure are provided below with reference to the schematic diagrams. The advantages and features of the disclosure will be better understand according to the following description and appended claims. It needs to be noted that accompanying drawings are all in a simplified form and in an inaccurate scale. They are only used for assisting in describing the propose of the embodiments of the disclosure in a convenient and clear way.

Figure 1:
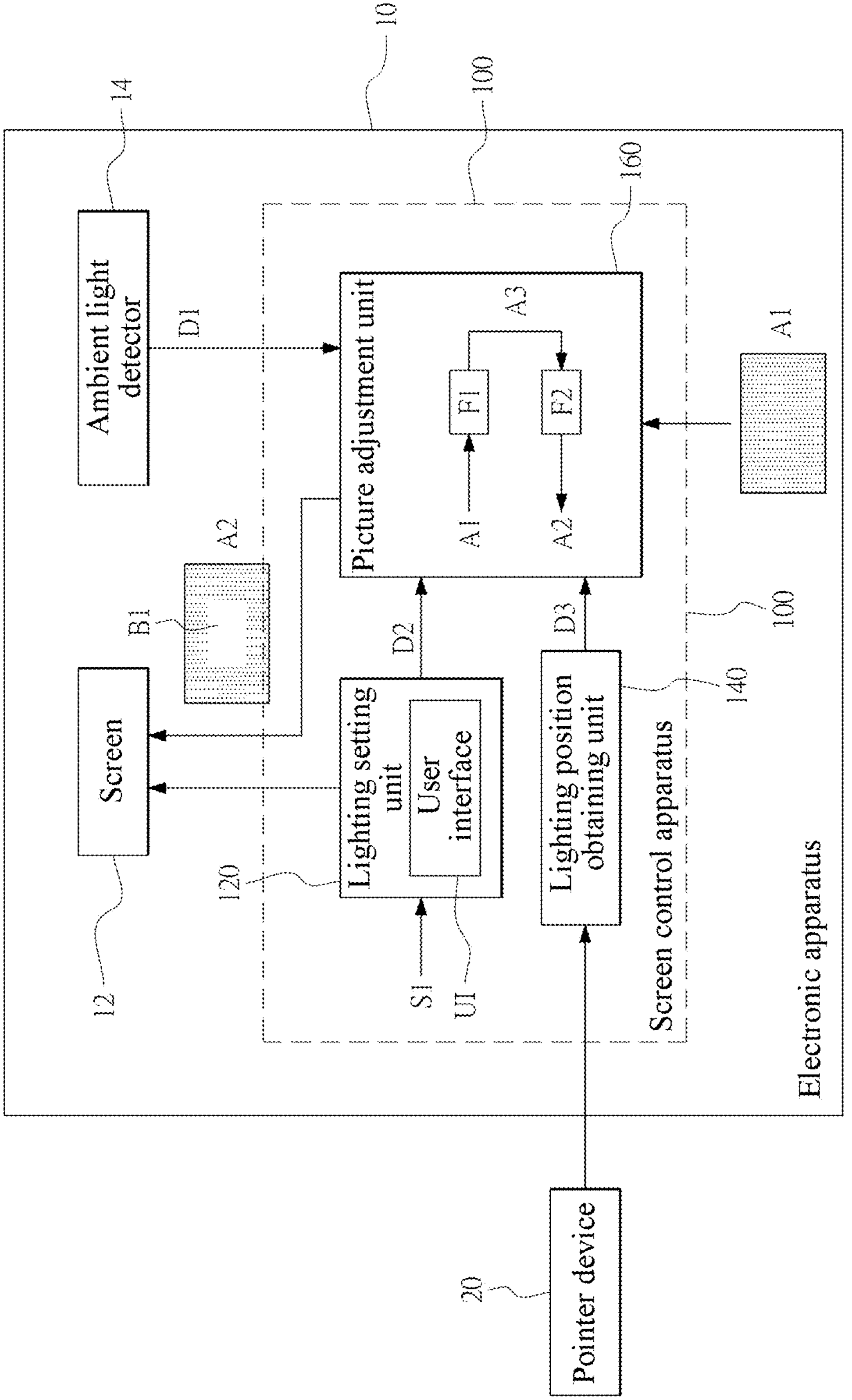
FIG. 1 is a schematic block diagram of a screen control apparatus according to an embodiment of the disclosure.

FIG. 1 is a schematic block diagram of a screen control apparatus 100 according to an embodiment of the disclosure.

As shown in the figure, the screen control apparatus 100 is applicable to an electronic apparatus 10. The electronic apparatus 10 includes a screen 12 and an ambient light detector 14. The screen 12 is configured to display an original picture A1. The ambient light detector 14 is configured to detect ambient brightness to generate ambient brightness data D1. In an embodiment, the electronic apparatus 10 is an electronic apparatus with an ambient light detection function, such as a notebook computer, a tablet computer, or a smartphone.

The electronic apparatus 10 is coupled to a pointer device 20 to present a pointer C1 on the original picture A1 accordingly. The pointer device 20 is a mouse, a touch pad, or a touch module integrated in the screen 12. In addition, the pointer device 20 is an independent electronic device independent of the electronic apparatus 10. In an embodiment, the pointer device 20 is alternatively an electronic module integrated in the electronic apparatus 10.

As shown in the figure, the screen control apparatus 100 includes a lighting setting unit 120, a lighting position obtaining unit 140, and a picture adjustment unit 160.

The lighting setting unit 120 is configured to set lighting setting data D2 corresponding to the pointer C1. In an embodiment, the lighting setting data D2 includes a lighting range parameter, a lighting shape parameter, and a lighting brightness parameter. The lighting range parameter and the lighting shape parameter are respectively used for setting a range and a shape of a lighting area B1. The lighting brightness parameter is used for setting a brightness difference between the lighting area B1 and another part of the original picture A1.

In an embodiment, the lighting setting unit 120 in the disclosure is also configured to present a user interface UI on the screen 12 of the electronic apparatus 10, for a user to perform setting. In an embodiment, the screen control apparatus 100 notifies, in response to a user input signal S1, the lighting setting unit 120 to start the user interface UI, and presents the user interface UI on the screen 12, for the user to perform setting.

Figure 2:
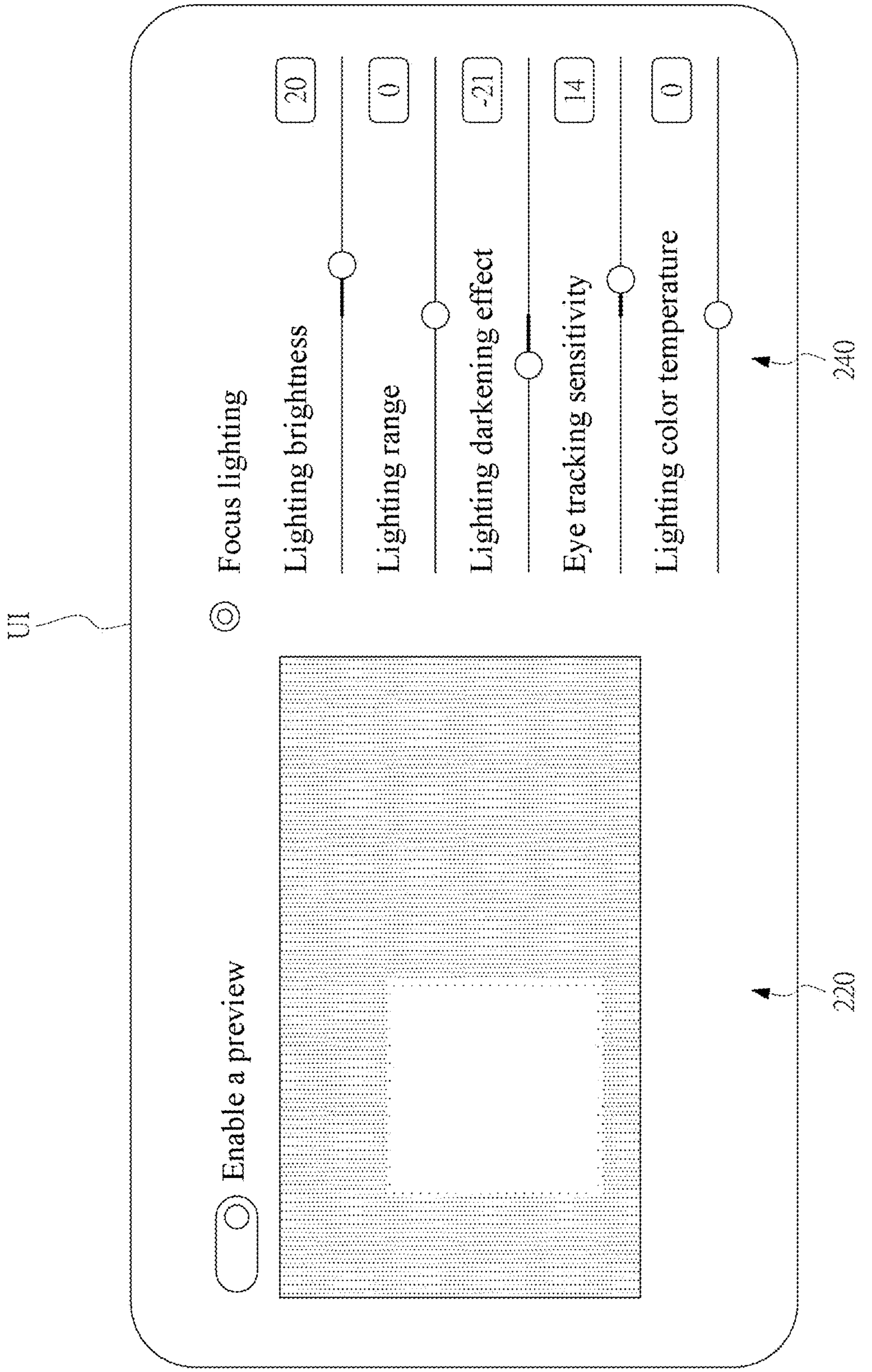
FIG. 2 is a schematic diagram of a user interface according to an embodiment of the disclosure.

Referring to FIG. 2 together, FIG. 2 is a schematic diagram of a user interface UI according to an embodiment of the disclosure.

As shown in the figure, the user interface UI is roughly distinguished into a left half 220 and a right half 240. A picture snapshot generated according to the current lighting setting is presented on the left half 220, for the user to determine a lighting effect. Currently set parameters such as a lighting range, a lighting shape, lighting brightness, and a lighting color temperature are presented on the right half 240. The user directly adjusts the parameters through the user interface UI, to change the lighting setting data D2.

The lighting position obtaining unit 140 is electrically coupled to the pointer device 20. The lighting position obtaining unit 140 is configured to obtain position data of the pointer C1, and generate lighting area data D3 according to the position data.

In an embodiment, the lighting position obtaining unit 140 first obtains the position data (a coordinate position) of the pointer C1 on the screen 12, uses the coordinate position of the pointer C1 as a center of the lighting area B1, generates the lighting area data D3 according to the lighting range parameter and the lighting shape parameter set in the lighting setting data D2, and defines the lighting area B1 around the pointer C1.

In this embodiment, the lighting position obtaining unit 140 obtains position data of a single pointer C1, to define, on the screen 12, a lighting area B1 that the user intends to browse or read accordingly. In another embodiment, the lighting position obtaining unit 140 obtains position data of multiple pointers C1, to define the lighting area B1 on the screen 12 accordingly. In an embodiment, the pointers C1 correspond to a diagonal position of the lighting area B1, or correspond to a center position and an edge position of the lighting area B1.

The picture adjustment unit 160 is electrically coupled to the lighting setting unit 120, the ambient light detector 14, the lighting position obtaining unit 140, and the screen 12. The picture adjustment unit 160 is configured to obtain the lighting setting data D2, the ambient brightness data D1, and the lighting area data D3; convert, according to the lighting setting data D2, the ambient brightness data D1, and the lighting area data D3, the original picture A1 to generate a lighting adjustment picture A2; and present the lighting adjustment picture A2 on the screen 12. The lighting adjustment picture A2 includes the lighting area B1 at a position corresponding to the pointer C1.

In an embodiment, the picture adjustment unit 160 includes a brightness adjustment algorithm F1 and a lighting adjustment algorithm F2. The brightness adjustment algorithm F1 is used for converting, according to the ambient brightness data D1, the original picture A1 to generate a brightness adjustment picture A3. Basically, the brightness adjustment algorithm F1 is used for entirely adjusting brightness of the original picture A1 to generate the brightness adjustment picture A3. The lighting adjustment algorithm F2 is used for converting, according to the lighting setting data D2 and the lighting area data D3, the brightness adjustment picture A3 to generate the lighting adjustment picture A2. Basically, the lighting adjustment algorithm F2 is used for locally adjusting brightness corresponding to the lighting area B1 in the brightness adjustment picture A3, to generate the lighting adjustment picture A2.

In other words, the brightness adjustment algorithm F1 adjusts overall brightness of the original picture A1 according to the ambient brightness data D1. The lighting adjustment algorithm F2 increases brightness (that is, reduces a gray scale) of a set area (the lighting area B1) on the original picture A1 according to settings of the lighting setting data D2 and the lighting area data D3.

Figure 3:
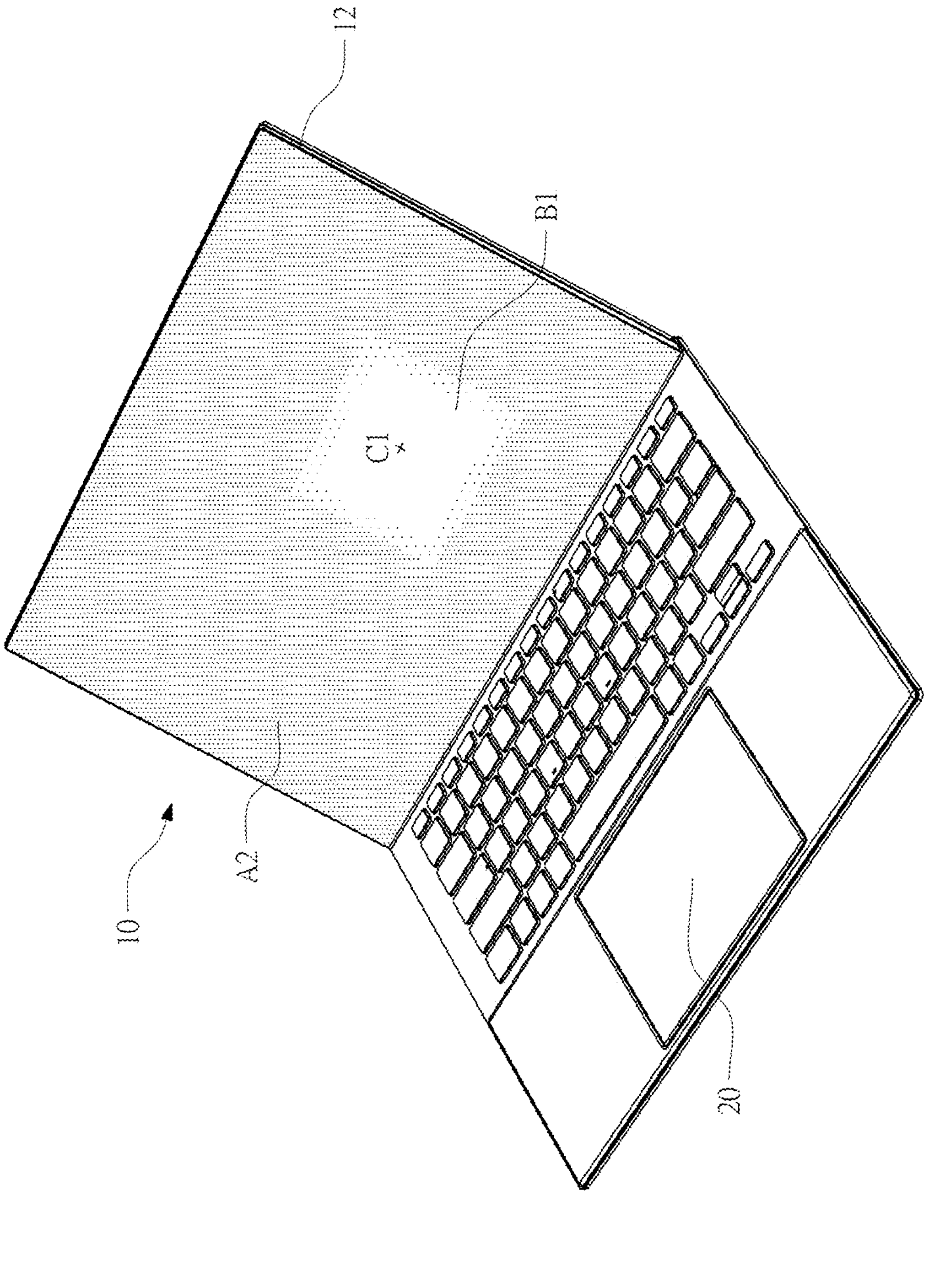
FIG. 3 is a schematic diagram of an electronic apparatus presenting a lighting adjustment picture.

Referring to FIG. 3 together, FIG. 3 is a schematic diagram of an electronic apparatus 10 presenting a lighting adjustment picture A2; As shown in the figure, in this embodiment, the electronic apparatus 10 is the notebook computer, and the touch pad integrated in the electronic apparatus 10 is the pointer device 20. The lighting adjustment picture A2 is presented on the screen 12 of the electronic apparatus 10. The lighting area B1 on the lighting adjustment picture A2 is a square area.

In this embodiment, the picture adjustment unit 160 increases brightness of a part of the original picture A1 corresponding to the lighting area B1, to generate the lighting adjustment picture A2. Another part of the original picture A1 maintains original brightness.

First, in the disclosure, the shape of the lighting area B1 defined on the lighting adjustment picture A2 is not limited to a square. The shape is also a circle, a rectangle, or another irregular shape predefined by the user.

In addition, in another embodiment, the picture adjustment unit 160 decreases the brightness of the another part of the original picture A1 while increasing the brightness of the part of the original picture A1 corresponding to the lighting area B1, to generate the lighting adjustment picture A2. In this way, brightness comparison between the lighting area B1 and another area is improved, and picture content of the lighting area B1 is highlighted.

In still another embodiment, in addition to increasing the brightness of the part of the original picture A1 corresponding to the lighting area B1, the picture adjustment unit 160 also changes picture presentation of another part except the lighting area B1 by using a picture adjustment algorithm. In an embodiment, the another part of the original picture A1 except the lighting area B1 is presented as a Mosaic picture by using a Mosaic algorithm. Alternatively, the another part of the original picture A1 except the lighting area B1 is presented as a blurry picture by using a ground glass filter algorithm.

In still another embodiment, the picture adjustment unit 160 also adjusts picture brightness in the lighting area B1 in a hierarchical manner by using an algorithm. Specifically, brightness of a partial picture within a central range of the lighting area B1 is decreased by a first default gray scale level. Brightness of a partial picture close to an edge portion of the lighting area B1 outside the central range is decreased by a second default gray scale level. The second default gray scale level is lower than the foregoing first default gray scale level. In this way, a lighting effect of high brightness in the middle and darkening brightness at the edges is presented in the lighting area B1.

Figure 4:
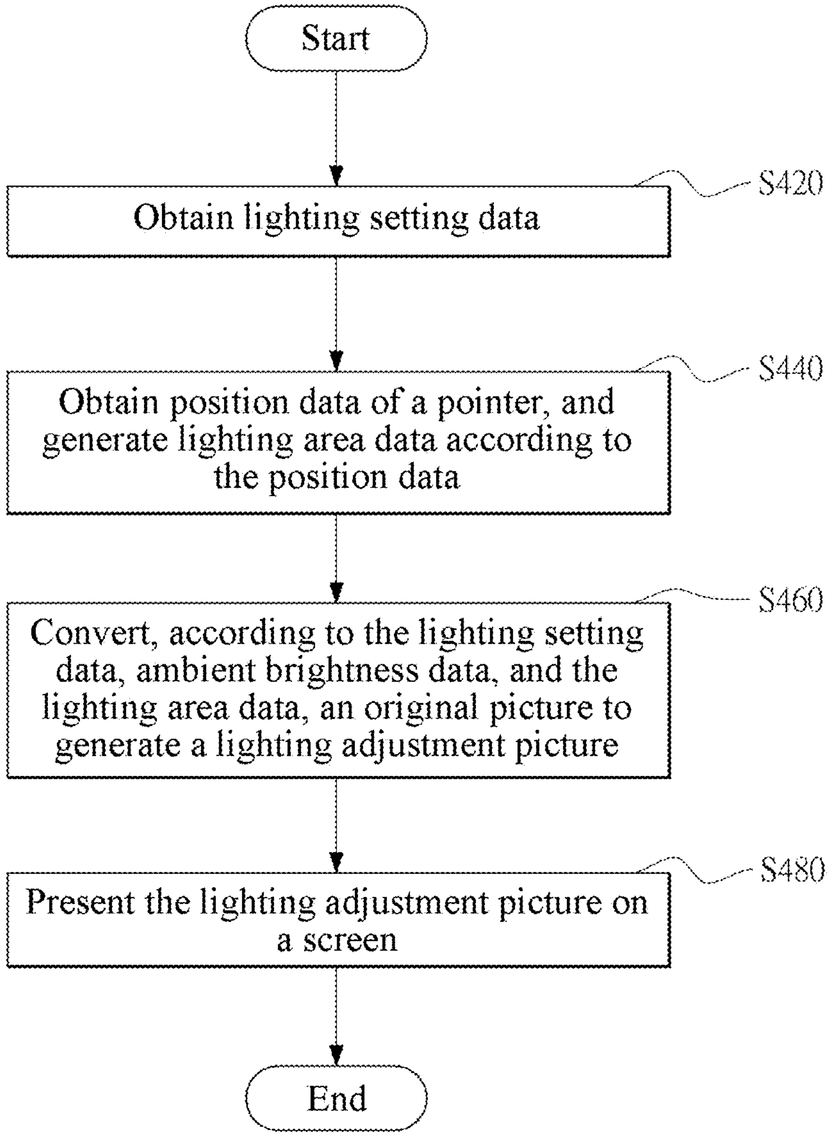
FIG. 4 is a flowchart of a screen control method according to an embodiment of the disclosure.

FIG. 4 is a flowchart of a screen control method according to an embodiment of the disclosure. The screen control method is applicable to the screen control apparatus 100 shown in FIG. 1, which is configured to an electronic apparatus 10. The electronic apparatus 10 includes a screen 12 and an ambient light detector 14. The screen 12 is configured to display an original picture A1. The ambient light detector 14 is configured to detect ambient brightness to generate ambient brightness data D1. The electronic apparatus 10 is also configured to couple to a pointer device 20 to present a pointer C1 on the original picture A1 accordingly. The pointer device 20 is a mouse or a touch pad.

The screen control method includes the following steps.

Step S420: Obtain lighting setting data D2. The step is performed by the lighting setting unit 120 in FIG. 1.

Step S440: Obtain position data of the pointer C1, and generate lighting area data D3 according to the position data. The step is performed by the lighting position obtaining unit 140 in FIG. 1.

Step S460: Convert, according to the lighting setting data D2, the ambient brightness data D1, and the lighting area data D3, the original picture A1 to generate a lighting adjustment picture A2, where the lighting adjustment picture A2 includes a lighting area B1 corresponding to the pointer C1. The step is performed by the picture adjustment unit 160 in FIG. 1.

Step S480: Present the lighting adjustment picture A2 on the screen 12. The step is performed by the picture adjustment unit 160 in FIG. 1.

Figure 5:
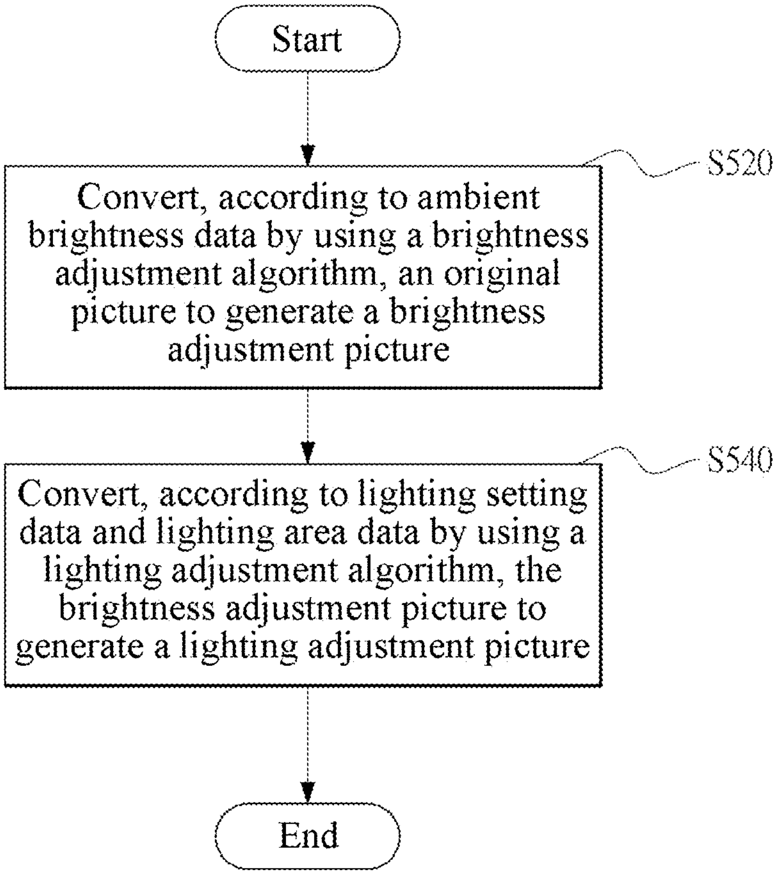
FIG. 5 shows an embodiment of step S460 in FIG. 4.

FIG. 5 shows an embodiment of step S460 in FIG. 4. The step is performed by the picture adjustment unit 160 in FIG. 1.

After the ambient brightness data D1, the lighting setting data D2, and the lighting area data D3 are obtained, the following steps are performed: Step S520: Convert, according to the ambient brightness data D1 by using a brightness adjustment algorithm F1, the original picture A1 to generate a brightness adjustment picture A3.

Step S540: Convert, according to the lighting setting data D2 and the lighting area data D3 by using a lighting adjustment algorithm F2, the brightness adjustment picture A3 to generate the lighting adjustment picture A2.

Figure 6:
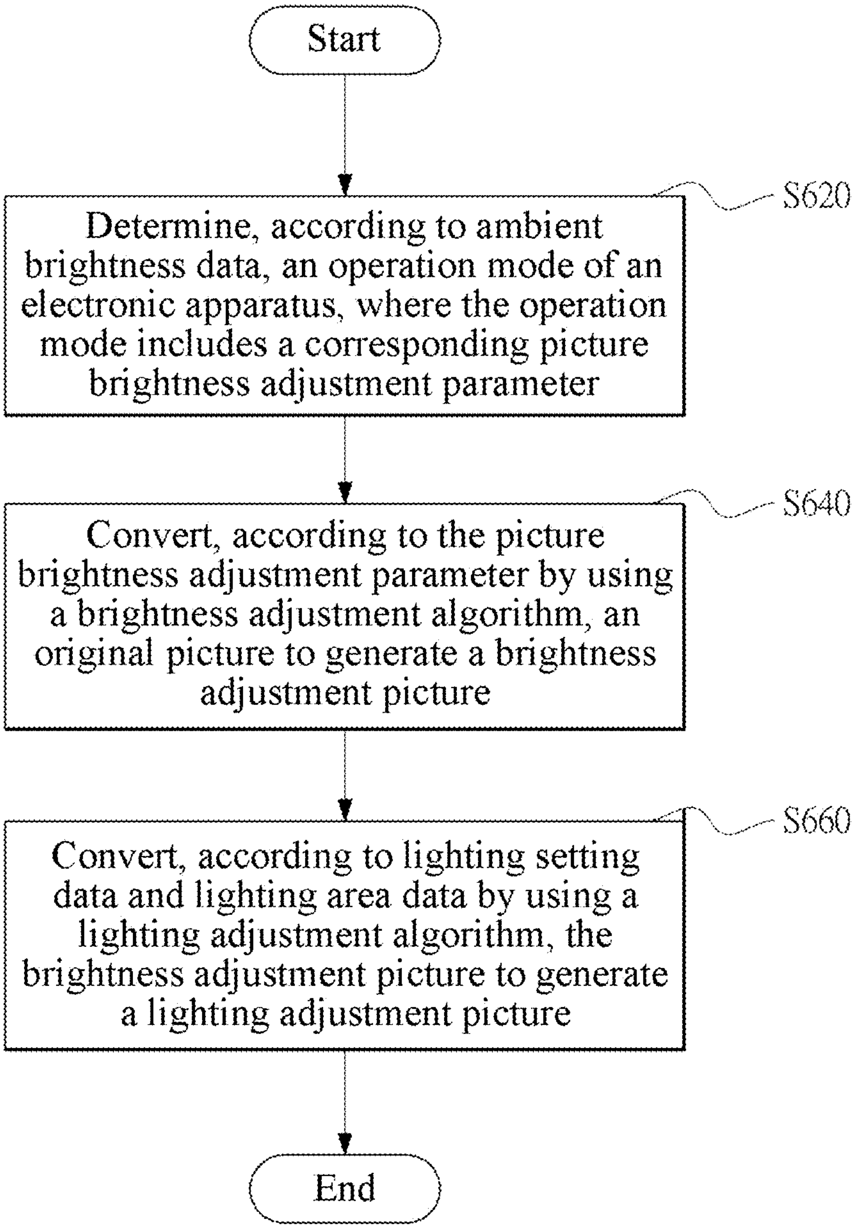
FIG. 6 shows another embodiment of step S460 in FIG. 4.

FIG. 6 shows another embodiment of step S460 in FIG. 4. The step is performed by the picture adjustment unit 160 in FIG. 1.

After the ambient brightness data D1, the lighting setting data D2, and the lighting area data D3 are obtained, the following steps are performed: Step S620: Determine an operation mode of the electronic apparatus 10 according to the ambient brightness data D1, where the operation mode includes a corresponding picture brightness adjustment parameter. In an embodiment, the operation mode is a night mode or a day mode.

Step S640: Convert, according to the picture brightness adjustment parameter by using a brightness adjustment algorithm F1, the original picture A1 to generate a brightness adjustment picture A3.

Step S660: Convert, according to the lighting setting data D2 and the lighting area data D3 by using a lighting adjustment algorithm F2, the brightness adjustment picture A3 to generate the lighting adjustment picture A2.

In conclusion, according to the screen control apparatus in the disclosure, an original picture A1 presented on a screen 12 is converted to a lighting adjustment picture A2 by using ambient brightness data D1 obtained by an ambient light detector 14 and lighting area data D3 obtained by tracking a position of a pointer device 20. This is beneficial to a user to browse or read content on a picture on the screen in a dark environment, without entirely increasing screen brightness. In this way, eye discomfort is reduced, and people around is also not affected. In addition, locally increasing picture brightness also effectively prevents sensitive information on the screen from being peeped at by people around, thereby improving privacy protection of data. In addition, in the disclosure, a lighting area B1 on the screen 12 is set by using a position of a pointer C1, so that this is more beneficial to the user to accurately set a position and a range of the lighting area B1, thereby improving working efficiency.

The foregoing is merely exemplary embodiments of the disclosure, and does not constitute any limitation on the disclosure. Any form of equivalent replacements or modifications to the technical means and technical content disclosed in the disclosure made by a person skilled in the related art without departing from the scope of the technical means of the disclosure still fall within the content of the technical means of the disclosure and the protection scope of the disclosure.

What is claimed is:

1. A screen control method, applicable to an electronic apparatus, wherein the electronic apparatus comprises a screen and an ambient light detector, the screen is configured to display an original picture, the ambient light detector is configured to detect ambient brightness to generate ambient brightness data, the electronic apparatus is also configured to couple to a pointer device to present a pointer on the original picture accordingly, the screen control method comprising:
 obtaining lighting setting data;
 obtaining position data of the pointer, and generating lighting area data according to the position data;
 converting, according to the lighting setting data, the ambient brightness data, and the lighting area data, the original picture to generate a lighting adjustment picture, wherein the lighting adjustment picture comprises a lighting area corresponding to the pointer; and
 presenting the lighting adjustment picture on the screen,
 wherein the lighting setting data comprises a lighting range parameter and a lighting shape parameter, and the step of obtaining position data of the pointer, and generating the lighting area data according to the position data comprises setting the pointer as a center of the lighting area, and generating the lighting area data according to the position data, the lighting range parameter, and the lighting shape parameter.

2. The screen control method according to claim 1, wherein the pointer device is a mouse or a touch pad.

3. The screen control method according to claim 1, wherein the lighting area is square, circular, or rectangular.

4. The screen control method according to claim 1, wherein the step of converting, according to the lighting setting data, the ambient brightness data, and the lighting area data, the original picture to generate the lighting adjustment picture comprises:
 converting, according to the ambient brightness data by using a brightness adjustment algorithm, the original picture to generate a brightness adjustment picture; and
 converting, according to the lighting setting data and the lighting area data by using a lighting adjustment algorithm, the brightness adjustment picture to generate the lighting adjustment picture.

5. The screen control method according to claim 1, further comprising:

determining an operation mode of the electronic apparatus according to the ambient brightness data, wherein the operation mode comprises a corresponding picture brightness adjustment parameter.

6. The screen control method according to claim 1, wherein the step of converting, according to the lighting setting data, the ambient brightness data, and the lighting area data, the original picture to generate the lighting adjustment picture comprises:

determining an operation mode of the electronic apparatus according to the ambient brightness data, wherein the operation mode comprises a corresponding picture brightness adjustment parameter;

converting, according to the picture brightness adjustment parameter by using a brightness adjustment algorithm, the original picture to generate a brightness adjustment picture; and converting, according to the lighting setting data and the lighting area data by using a lighting adjustment algorithm, the brightness adjustment picture to generate the lighting adjustment picture.

7. The screen control method according to claim 1, wherein the lighting setting data further comprises a lighting range, a lighting shape, lighting brightness, and a lighting color temperature.

8. A screen control apparatus, applicable to an electronic apparatus, wherein the electronic apparatus comprises a screen and an ambient light detector, the screen is configured to display an original picture, the ambient light detector is configured to detect ambient brightness to generate ambient brightness data, the electronic apparatus is also coupled to a pointer device to present a pointer on the original picture accordingly, and the screen control apparatus comprising:

a lighting setting unit, configured to set lighting setting data corresponding to the pointer;

a lighting position obtaining unit, configured to obtain position data of the pointer, and generate lighting area data according to the position data; and a picture adjustment unit, configured to convert, according to the lighting setting data, the ambient brightness data, and the lighting area data, the original picture to generate a lighting adjustment picture, and present the lighting adjustment picture on the screen, wherein the lighting adjustment picture comprises a lighting area corresponding to the pointer, wherein the lighting setting data comprises a lighting range parameter and a lighting shape parameter, and the lighting position obtaining unit is configured to set the pointer as a center of the lighting area, and generate the lighting area data according to the position data, the lighting range parameter, and the lighting shape parameter.

9. The screen control apparatus according to claim 8, wherein the pointer device is a mouse or a touch pad.

10. The screen control apparatus according to claim 8, wherein the lighting area is square, circular, or rectangular.

11. The screen control apparatus according to claim 8, wherein the picture adjustment unit is configured to convert, according to the ambient brightness data, the original picture to generate a brightness adjustment picture; and convert, according to the lighting setting data and the lighting area data, the brightness adjustment picture to generate the lighting adjustment picture.

12. The screen control apparatus according to claim 8, wherein the lighting setting data further comprises lighting brightness, and a lighting color temperature.

* * * * *